United States Patent [19]

Berson et al.

[11] Patent Number: 4,860,025

[45] Date of Patent: Aug. 22, 1989

[54] THERMAL TRANSFER PRINTING PROCESS

[75] Inventors: William Berson, Westport; Julius Gluck, Norwalk; Patrick Murphy, Stamford; Duc H. Tran, Bridgeport, all of Conn.

[73] Assignee: Pitney Bowes Inc., Stamford, Conn.

[21] Appl. No.: 138,428

[22] Filed: Dec. 28, 1987

[51] Int. Cl.⁴ .............................................. G01D 9/00

[52] U.S. Cl. .............................. 346/1.1; 346/76 PH; 400/120

[58] Field of Search .......................... 346/1.1, 76 PH; 400/120 PH

[56] References Cited

U.S. PATENT DOCUMENTS 4,739,343 4/1988 Dolan ............................ 346/76 PH 4,740,798 4/1988 Shinoazaki ..................... 346/76 PH

*Primary Examiner*—C. L. Albritton

*Assistant Examiner*—Huan Tran

*Attorney, Agent, or Firm*—Donald P. Walker; Melvin J. Scolnick; David E. Pitchenik

[57] ABSTRACT

In printing apparatus of the type which includes a ribbon having a backing layer and an ink donor layer supported on the backing layer, wherein the apparatus includes a first thermal printhead for transfer printing a first ink pattern from the ink donor layer to the backing layer at a first printing station, a second thermal printhead for transfer printing a second ink pattern from the ink donor layer to a workpiece at a second printing station, there is provided a process including the steps of: sensing a letter being fed to the second printing station; starting feeding the ribbon; starting printing at the first printing station; moving the second printhead from a non-printing position to a printing position; starting printing at the second printing station; stopping printing at the first and second printing stations; stopping feeding the ribbon; and moving the second printhead from the printing position to the non-printing position.

21 Claims, 10 Drawing Sheets

THERMAL TRANSFER PRINTING PROCESS

BACKGROUND OF THE INVENTION

This invention is generally concerned with apparatus for processing letters and more particularly with thermal printing apparatus for automatically marking stepped or otherwise irregularly-shaped letters including letter mail.

A significant proportion of the approximately one-half billion irregularly-shaped letters, flats, parcels, and other irregularly-shaped mailpieces, such as stepped letter mail, hotel keys, bagged film and the like, which are annually received by the U.S. Postal Service for processing, must be manually processed due to the lack of automated equipment. In the case of stepped, and other irregularly-shaped letter mail, automatic separation equipment is available for separating such mail from the main stream of incoming mailpieces, but there has been a long felt need for reliable machinery for handling other processing tasks. In particular, manual processing is heavily relied upon for performing such functions as cancelling the postage of stepped and other irregularly-shaped letter mail, and marking the same with appropriate destination bar codes for subsequent sorting. Moreover, the marking function implemented in the course of processing irregularly-shaped letter mail ranks amongst the highest of the labor intensive activities engaged in by Postal Services on a worldwide basis.

Of course, large private mailers of stepped and other irregularly-shaped letters are similarly burdened with labor intensive processing activities, including applying addresses, postage indicia and bar codes to letters for delivery to the Postal Service.

For marking letters, including letter mail, thermal transfer printing offers an advantage over die cast image transfer processes, in that images transferred by means of thermal transfer printing processes exhibit higher quality image resolution than other printing processes. Although the quality of image resolution is clearly sensitive to irregularities in the shape of the surface area on which the image is printed, such irregularities may be compensated for by subjecting the printhead to high compression loads. On the other hand, continuously subjecting thermal printheads to high compression loads leads to shortening the useful life of the printheads. Nevertheless, for thermal transfer printing on rough-surfaced letter mail, thermal printing structures have been provided wherein the thermal printhead pressure has been held to as low a pressure level as possible without sacrificing the quality of image resolution. In this connection, reference is made to U.S. patent application Ser. No. 000,584 of Danilo P. Buan, Albert C. Chiang and Donald T. Dolan for a Thermal Transfer Printing Apparatus And Method, filed Jan. 6, 1987 and assigned to the assignee of the present invention. On the other hand, thermal printheads have not been adapted for applying a variable pressure for marking stepped or other irregularly-shaped letters, including letter mail.

Accordingly:

An object of the invention is to provide thermal printing apparatus for marking stepped or other irregularly-shaped letters, including letter mail;

Another object to provide thermal printing apparatus including improved means for urging a thermal transfer ribbon and letter into engagement with one another;

Another object is to provide means for resiliently supporting a thermal printhead;

Another object is to provide a flexible roller for use as a platen in thermal printing apparatus;

Another object is to provide a process for controlling thermal transfer printing; and Yet another object is to provide thermal transfer printing apparatus which includes a flexible roller and resiliently supported thermal printhead which are operatively associated with each other for urging a thermal transfer ribbon and letter into engagement with one another.

SUMMARY OF THE INVENTION

In printing apparatus of the type which includes a ribbon having a backing layer and an ink donor layer supported on the backing layer, wherein the apparatus includes a first thermal printhead for transfer printing a first ink pattern from the ink donor layer to the backing layer at a first printing station, a second thermal printhead for transfer printing a second ink pattern from the ink donor layer to a workpiece at a second printing station, a process comprising the steps of: sensing a letter being fed to the second printing station; starting feeding the ribbon; starting printing at the first printing station; moving the second printhead from a non-printing position to a printing position; starting printing at the second printing station; stopping printing at the first and second printing stations; stopping feeding the ribbon; and moving the second printhead from the printing position to the non-printing position.

DESCRIPTION OF THE PREFERRED EMBODIMENTS

Figure 1:
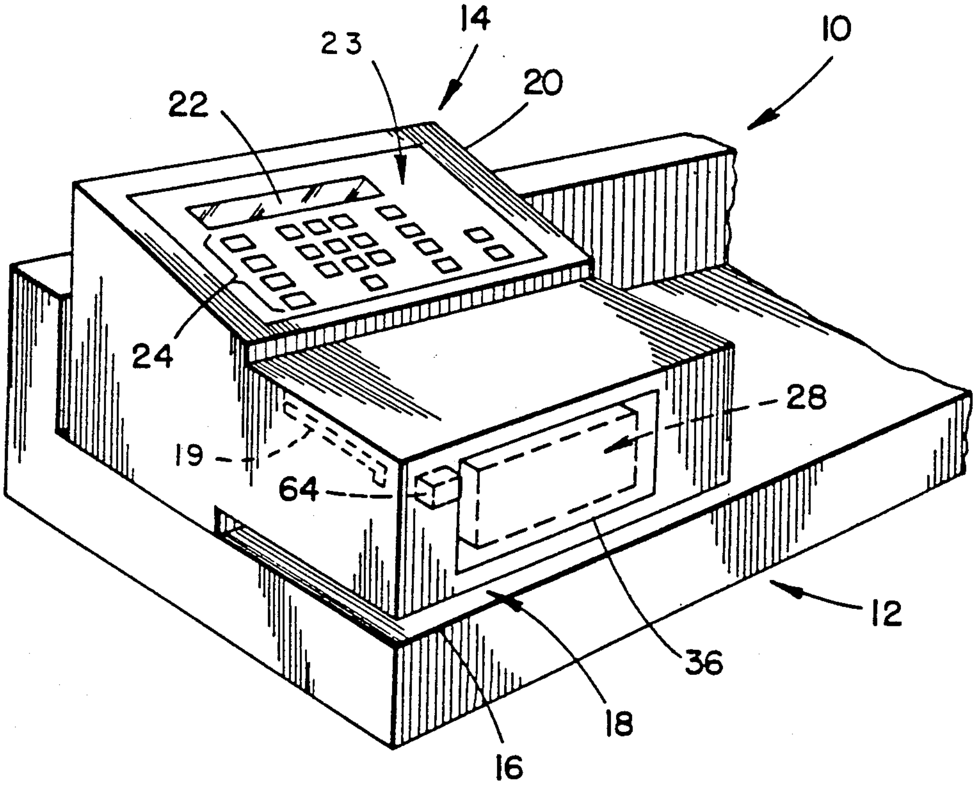
FIG. 1 is a partial perspective view of a mailing machine including an electronic postage meter, embodying the invention.

As shown in FIG. 1, a mailing machine 10, of the type which may be modified to include the invention, generally includes a mailing machine base 12 and an electronic postage meter 14. The meter 14 is removably mounted on the base 12, which includes a platen 16. The meter 14 overhangs the platen 16 and defines therewith an indicia printing station, generally indicated at 18, for receiving letters manually fed thereto or fed thereto from a suitable feeder (not shown). The meter 14 generally includes conventional framework 19, a housing 20, a display 22, and a suitable keyboard 23 including a plurality of keys 24. In addition to the keyboard 23 and display 22, the machine's electronic circuitry 26 (FIG. 2) includes a microcomputer IC located within the meter housing 20 and conventionally operatively coupled to the keyboard keys 24 and display 22.

Figure 2:
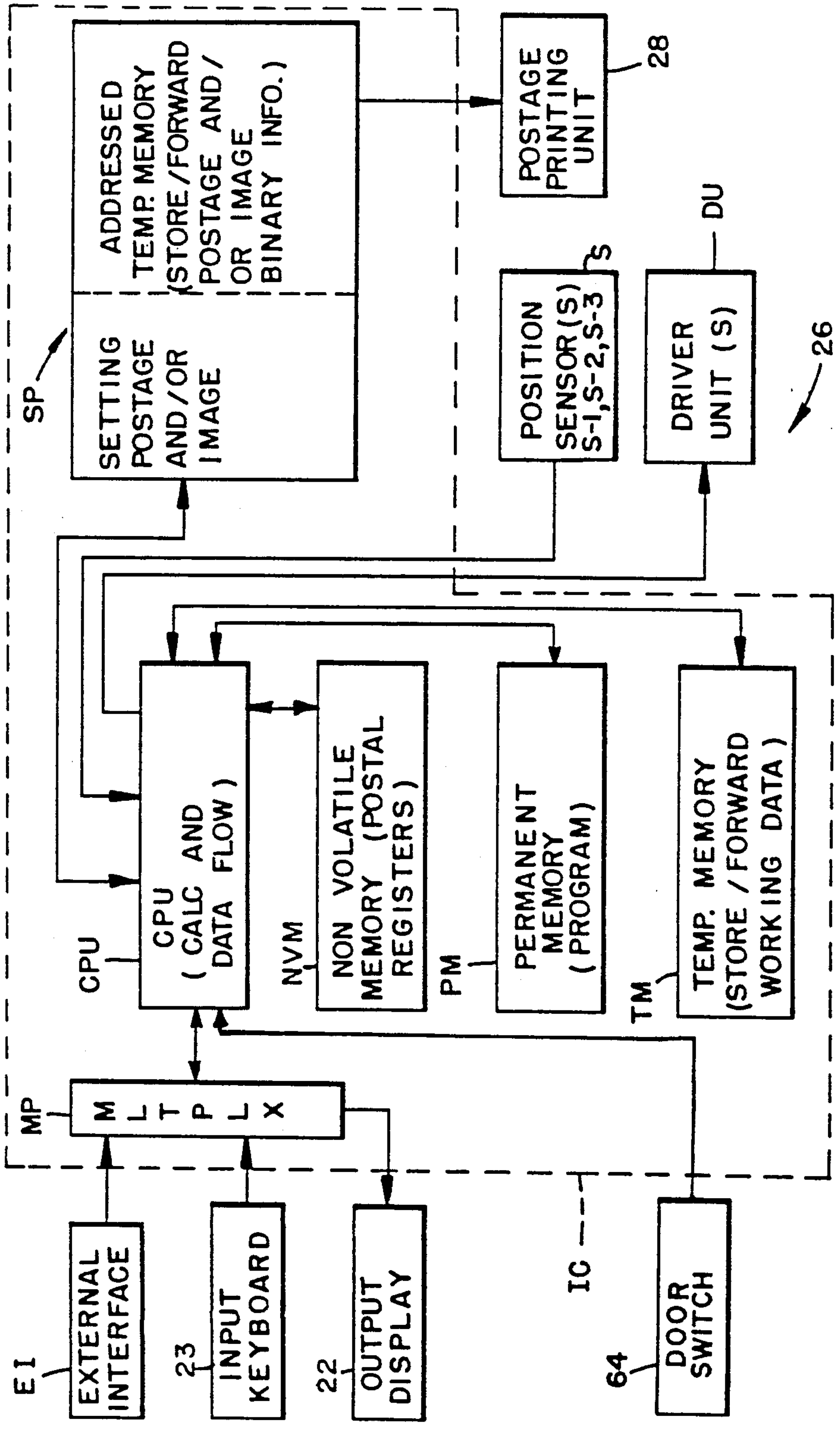
FIG. 2 is a schematic diagram of an electronic control system for operating the mailing machine of FIG. 1.

As shown in FIG. 2, the microcomputer IC includes a conventional CPU for performing processes based on input data received from the keyboard 23, a door switch 64 and any one or more external interfaces EI and sensors S. In addition, the CPU is operable for controlling the flow of data between the CPU and a permanent memory PM, temporary memory TM and non-volatile memory NVM. Moreover, the CPU is operable for controlling the flow of data between the CPU and postage setting circuitry SP for operating a postage printing unit 28. Further, the CPU is operable for receiving input data from various sensors S and for controlling one or more drive units DU. Preferably, the external interface EI and keyboard 23 are coupled to the CPU via a conventional multiplex circuit MP, and the CPU is coupled to the display 22 via the multiplex circuit MP.

The permanent memory PM is a conventional non-alterable memory, coupled to and controlled by the CPU for implementing programs stored in the permanent memory PM, including routines for performing postal data calculations in accordance with input data, and data stored in the memories TM and NVM, and for performing other routines for operating the machine 10 according to the invention. The temporary memory TM is a conventional working memory, coupled to and controlled by the CPU for temporarily storing working data in accordance with the routines performed by the CPU. And the non-volatile memory NVM is a conventional non-volatile memory, coupled to and controlled by the CPU, in which data is stored when the machine 10 is deenergized, for use whenever the machine 10 is energized. For example, the non-volatile memory NVM stores accounting and operating data critical to the security of the postage meter 14 and to the operation of the machine 10, including accounting data corresponding to the current total of all postage dispensed by the postage meter 14 and the current total of postage available for printing by the postage meter 14, which totals are respectively credited and debited with each postage dispensing operation of the postage meter 14. Further, the non-volatile memory NVM may store data corresponding to the maximum postage value that the meter 14 may dispense at any one time, data corresponding to the serial number of the postage meter and other selected postage meter operating constants.

In operation, data from the keyboard 23 (FIG. 1) or from an external interface EI, such as a scale, computer, mail management system, or the like, is received and processed by the CPU in accordance with routines stored in the permanent memory PM. At any time during the operation of the machine 10, should information corresponding to the data contents of a given memory, including the total available postage, total dispensed postage, or other accumulations, such as a batch count or the serial number of the postage meter 14, be desired to be displayed, an appropriate instruction from the keyboard 23 or external interface EI causes the CPU to access the appropriate memory location storing the corresponding data and operate the display 22 for displaying the information.

Under control of the CPU, when appropriate postal data information is provided from the keyboard 23 or external interface EI, and all of the conditions are met for dispensing postage, including for example a determination that the postage value desired to be dispensed does not exceed the maximum postage value that may be dispensed at any one time, the postage setting device SP will respond to an appropriate output signal from the CPU to generate a binary bit message addressed to an appropriate register of the temporary memory TM, indicating that the printing unit 28 has been initialized, i.e., the initial functions of setting the postage and readying the postage printing unit 28 for printing have been accomplished. A more detailed description of the above described electronic circuitry 26 may be found in commonly assigned U.S. Pat. No. 4,568,950 issued Feb. 4, 1986.

Figure 3:
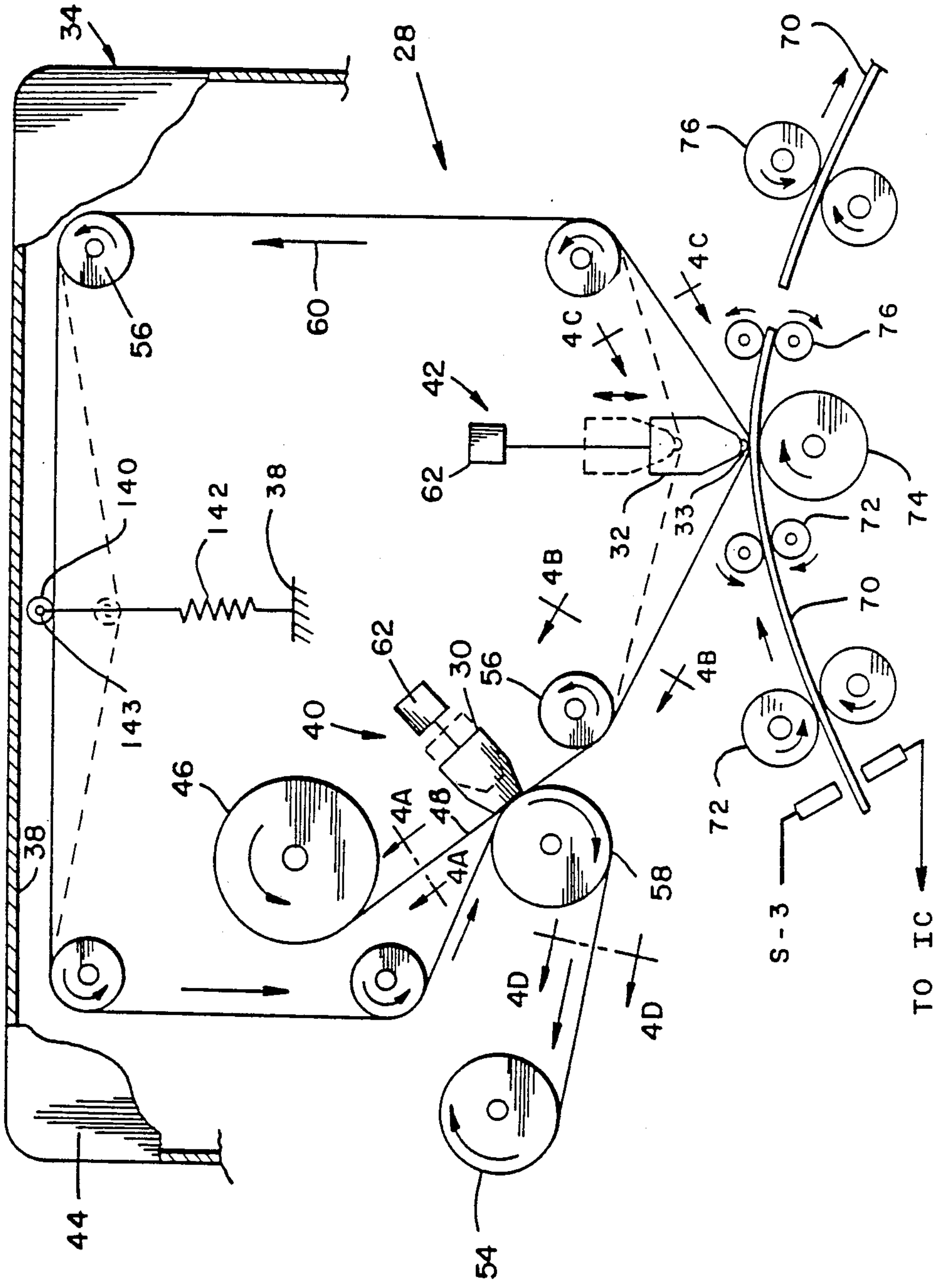
FIG. 3 is a diagrammatic view of a thermal ribbon cassette a positioned within the postage meter of the machine of FIG. 1.

As shown in FIG. 3, the postage printing unit 28 includes two, suitable, commercially available, thermal printheads 30, 32 which are responsive to the output of the microcomputer IC. The printhead 30 preferably includes a digitally responsive, single-line dot-matrix-type printhead element which is responsive to input data from the microcomputer IC for printing a pattern corresponding to a predetermined postage image including a variable postage value, whereas the printhead 32 preferably includes a heating bar 33 capable of operating at pressures in the range of from 2 to 20 lbs. per linear inch of length of the printhead 32 without appreciable wear. Preferably, both printheads 30, 32 are sufficiently small in size and mass to enable printing to commence immediately without a warm-up period. Thus, the printheads 30, 32 are capable of being heated to the required temperature for transferring ink from the ink donor layer 52 of the ribbon 48 substantially instantly, in response to energization signals applied to the printhead 30, 32 under the control of the electronic circuitry 26, and are capable of being cooled to a temperature below the ink transfer temperature substantially instantly, in response to deenergization signals applied to the printhead 30, 32 under the control of the electronic circuitry 26. A more detailed description of a typical printheads 30, 32 is shown and described in U.S. Pat. No. 4,429,318 issued Jan. 31, 1984 to Kobata.

The housing 20 (FIG. 1) includes a hinged door 36, through which a ribbon cartridge or cassette 34 (FIG. 3) may be admitted for removable mounting within the housing 20 (FIG. 1) by any suitable means.

The ribbon cassette 34 (FIG. 3) includes a frame 38 which defines first and second printing stations, 40 and 42, respectively, and an integral enclosure 44 which houses the various components of the cassette 34. The cassette 34 includes a ribbon supply spool 46 which is conventionally rotatably connected to the frame 38 within the enclosure 44. A thermal transfer ribbon 48, which is wound about the supply spool 46 and extends therefrom, includes a backing layer 50 (FIG. 4A) which is preferably composed of a "MYLAR" brand plastic film, or equivalent, approximately 0.25 to 0.5 mils in thickness, and includes an ink donor layer 52 which is a thermally activatable ink coating applied to one side of the backing layer 50. In addition, the cassette 34 includes a ribbon take-up spool 54, which is conventionally rotatably connected to the frame 38 within the enclosure 44. The ribbon 48 extending from the supply spool 46 is suitably connected to the take-up spool 54. Further, for guiding the ribbon from the supply spool 46 to the take-up spool 54, the cassette 34 includes a plurality of idler rollers 56 and a printhead backing roller 58, which are respectively rotatably connected to the frame 38 within the enclosure 44. The backing roller 58 is located at the first printing station 40 opposite the printhead 30. As shown by the arrows 60, the ribbon path extends from the supply spool 46, through the first and second printing stations, 40 and 42, respectively, and again through the first printing station 40, then about the cassette's backing roller 58 to the take-up spool 54.

To facilitate threading or otherwise locating the thermal ribbon 48 (FIG. 3) in appropriate relationship with respect to the thermal printheads 30, 32 when the cassette 34 is inserted into the postage printing unit 28, each of the thermal printheads 30, 32, may be adapted to be moved between a non-printing, ribbon-locating position as shown by the dashed lines, and a printing, ribbon feeding, position as shown, by the solid lines. Such movement has been achieved by means of the provision of a pair of two-position solenoids 62 operatively coupled on a one-for-one basis to each of the thermal printheads; in which instance the solenoids 62 may be energized and deenergized by operation of a two-position switch 64 (FIG. 1) which is conventionally coupled to and operable by movement of the door 36. For example, movement of the switch 64 to one of its positions, in response to opening the door 36, energizes the solenoids 62 (FIG. 3) for causing the printheads 30, 32 to be positioned in their respective non-printing positions, whereas movement of the switch 64 (FIG. 1) to the other of its positions, in response to closing the door, deenergizes the solenoids 62 (FIG. 3) for causing the printheads 30, 32 to be positioned in their respective printing positions.

When the cassette 34 (FIG. 3) is inserted into the postage printing unit 28, the printhead backing roller 58 is operatively engaged with a driver unit DU (FIG. 2) which is conventionally constructed and arranged for appropriately rotating the printhead backing roller 58 under the control of the CPU, to feed the thermal ribbon 48 from the supply spool 48 and along the aforesaid feed path to the take-up spool 54. Moreover, the take-up spool 54 is operatively engaged with another driver unit DU which includes a slip clutch (not shown) for spooling thereon the ribbon fed thereto from the ribbon backing roller 58.

For feeding letters 70 (FIG. 3) to and from the second printing station 42, the machine 10 includes one or more pairs of input pinch rollers 72, a printhead backing roller 74 and one or more pairs of output pinch rollers 76, each of which rollers 72, 74 and 76, are conventionally rotatably connected to the machine's frame 19 (FIG. 1) and conventionally coupled to a driver unit DU (FIG. 2) for control by the microcomputer IC.

Figure 5A:
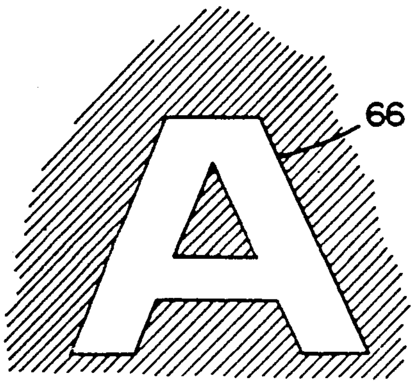
FIG. 5A is an ink pattern corresponding to an outline of an indicia.
Figure 5B:
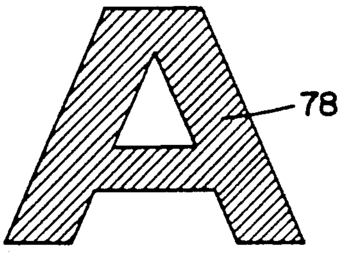
FIG. 5B is an ink pattern corresponding to an indicia.
Figures 4A, 4B, 4C, 4D:
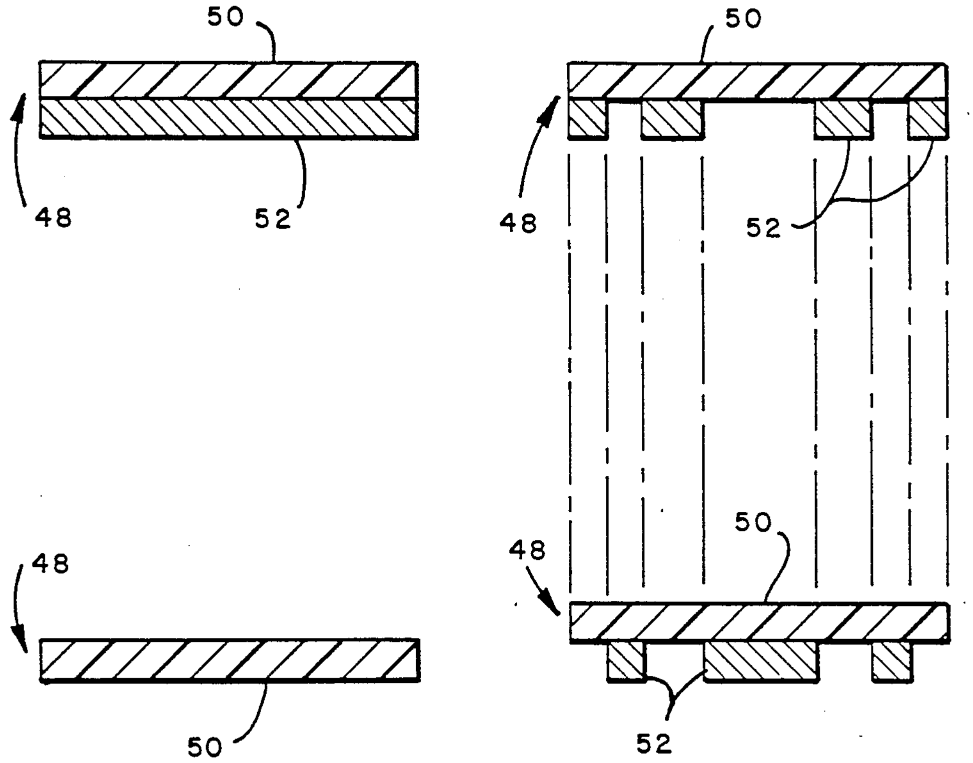
FIG. 4A is a section, taken substantially along the line 4A—4A of FIG. 3, showing the thermal transfer ribbon as it is fed from the ribbon supply spool.
FIG. 4B is a section, taken substantially along the line 4B—4B of FIG. 3, showing the thermal transfer ribbon as it is fed to the thermal printhead for printing an image on a letter.
FIG. 4C is a section, taken substantially along the line 4C—4C of FIG. 3, showing the thermal transfer ribbon as it is fed from the thermal printhead after printing an image on a letter.
FIG. 4D is a section, taken substantially along the line 4D—D of FIG. 3 showing the thermal transfer ribbon as it is fed onto the ribbon take-up spool.

As the thermal transfer ribbon 48 (FIG. 3) is initially fed from the supply spool 46, it has the longitudinally-extending cross-section illustrated in Fig 4A, wherein the backing layer 50 is faced towards the printhead 30 (FIG. 3), and the ink donor layer 52 is faced away from the printhead 30, and has not as yet been altered thereby. As the ribbon 48 advances through the first printing station 40, the ribbon's ink donor layer 52 faces the backing layer of that portion of ribbon 48 which has most recently been advanced from the second printing station 42 and is looped about the backing roller 58. Under the control of suitable energization and deenergization signals received from the microcomputer IC (FIG. 2), the printhead 30 (FIG. 3) transfers ink from the ribbon's unaltered ink donor layer 52 to the adjacent ribbon backing layer 50. This results in an image pattern corresponding to an outline-of-indicia, or indicia background, 66 (FIG. 5A), being transferred to the adjacent backing layer 50 (FIG. 4D). In addition, this results in the thermal ribbon 48 (FIG. 3) leaving the printing station 40 having a remaining pattern corresponding to an indicia 78 (FIG. 5B) on the backing layer 50 (FIG. 4D) for printing on a letter 70 (FIG. 3) fed to the second printing station 42 by the input feed rollers 72. Thus as the letter 70 is fed between the ribbon 48 and the ribbon backing roller 74 at the second printing station 40 the indicia 78 (FIG. 5B) is thermally transferred to a letter 70 (FIG. 3). This results in the ribbon 48 fed from the second printing station 42, to the first printing station 40, including only the backing layer (FIG. 4C). The letter 70 (FIG. 3) is thereafter withdrawn from the printing station 42 by means of the output feed rollers 76 Although in this description the pattern of an outline-of-indicia 66 is described as being applied to the backing layer 50 at the first station 40, the pattern of the indicia 78 (FIG. 5B) may instead be transferred at the first station 40 (FIG. 3) whereby the remaining pattern of the outline-of-indicia 66 (FIG. 5A) would be transferred to the letter 70 (FIG. 3) at the second printing station 42.

Figure 6:
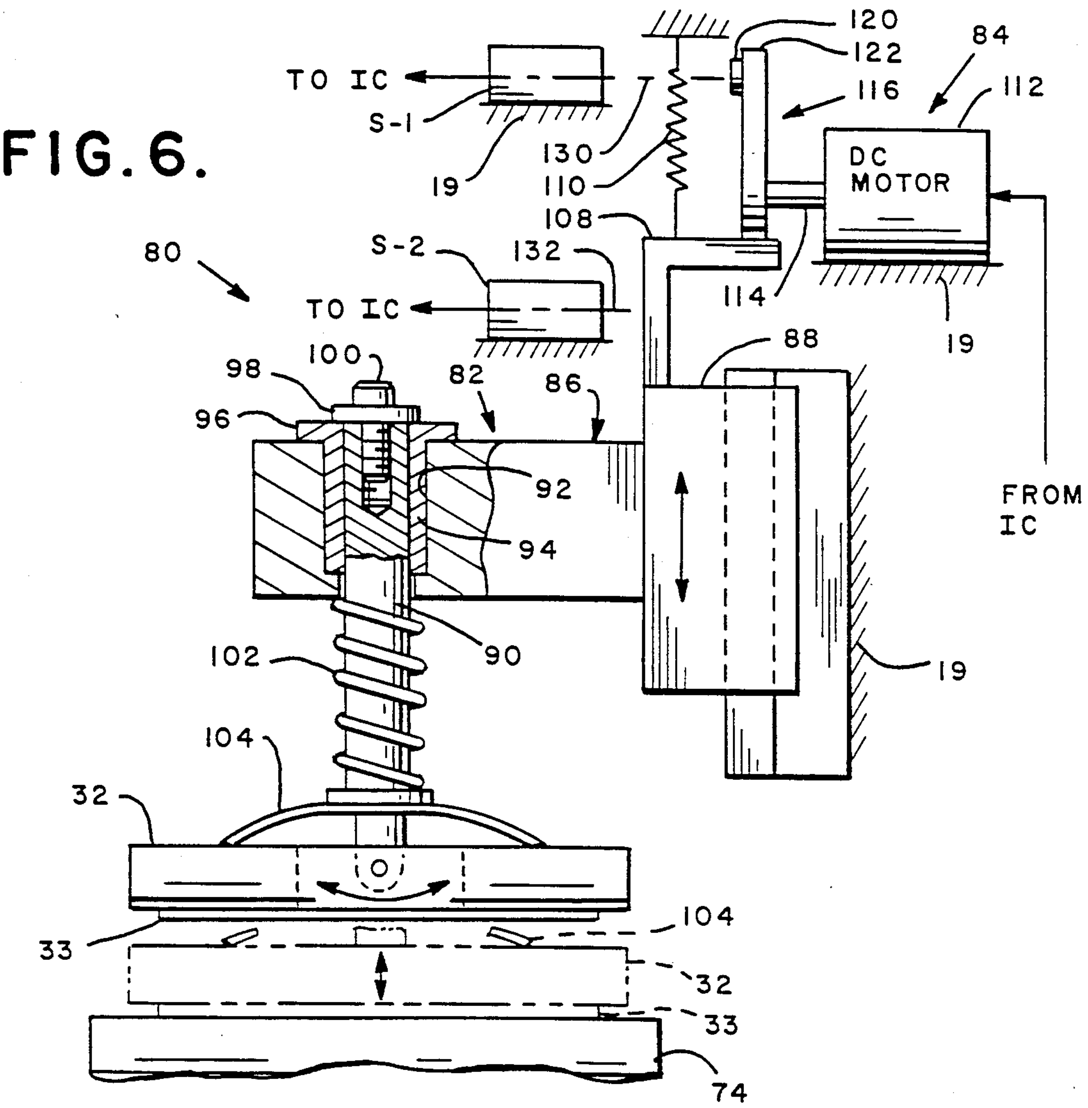
FIG. 6 is a diagrammatic view of apparatus for controlling printhead pressures in thermal printing apparatus.

According to the invention, at the second printing station 42 (FIG. 3) the solenoid 62 is preferably replaced by the printhead controlling apparatus 80 shown in FIG. 6, including the printhead supporting and moving structures, respectively designated 82 and 84.

The printhead supporting structure 82 (FIG. 6) includes an arm 86 having a base 88 which is conventionally slidably connected to the meter's framework 19. In addition, the supporting structure 82 includes a shaft 90 for carrying the printhead 32. One end of the shaft 90 is slidably mounted within an opening 92 formed in the arm 86, and the other end of the shaft 90 is connected to the printhead 32. Moreover, the shaft 90 includes a shoulder 91 located near the aforesaid other, printhead end, of the shaft 90. For slidably connecting the shaft 90 to the arm 86, the arm's opening 92 is faced with a bearing bushing 94 within which the shaft 90 is slidably mounted. The bushing 94 includes a flange 96 disposed in abutment with the arm 86. For resiliently mounting the shaft 90 within the bushing 94, the supporting structure 82 includes a washer 98, which overhangs the bushing flange 96, and a machine screw 100, which threadably engages the shaft 90 for holding the washer 98 in abutment with one end of the shaft 90. In addition, shaft mounting structure includes a spring 102 which encircles the shaft 90 and is disposed between the arm 86 and printhead 32. Preferably one end of the spring 102 is disposed in abutment with the arm 86, and the other end of the spring 102 is disposed in abutment with the shaft's shoulder 91. Since the spring 102 is biased to urge the printhead 32 away from the arm 86, and thus towards the printhead backing roller 74, the washer 98 is normally held in abutment with the bearing flange 96. On the other hand, since the shaft 90 is slidably movable within the bearing bushing 94, the printhead 32 is movable towards the arm 86, and thus away from the backing roller 74, against the opposing force exerted by the spring 102. Preferably, the printhead 32, is conventionally pivoted at the midpoint thereof to the other end of the shaft 90, and a leaf spring 104 is connected between the shoulder 91 of the shaft 90 and the printhead 32 for resiliently constraining pivotal movement of the printhead 32 relative to the shaft 90.

The printhead moving structure 84 (FIG. 6) also includes a cam follower 108, which is conventionally fixedly connected to the base 88 of the arm 86, and a third spring 110 having one end conventionally connected to the meter's framework 19 and the other end conventionally connected to the cam follower 108. The spring 110 is biased for urging the cam follower 108, and thus the arm 86, away from the backing roller 74. In addition, the printhead moving structure 84 includes a d.c. motor 112 having an output shaft 114 on which there is mounted a cam 116. The cam 116 is suitably disposed in engagement with the cam follower 108. And the motor 112 is conventionally connected to the microcomputer IC (FIG. 2) via one or more driver units DU, and controlled by the CPU for timely rotating the cam 112 in engagement with the cam follower 108, against the force exerted on the cam follower 108 by the spring 110

Figure 7:
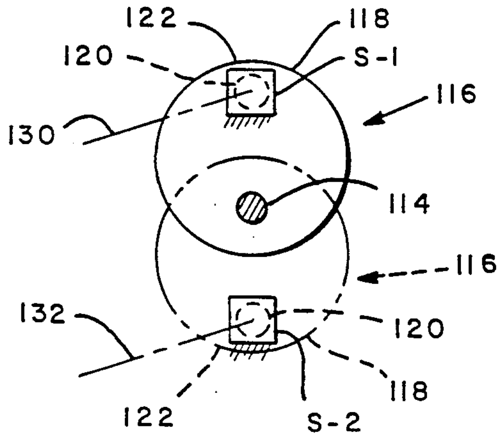
FIG. 7 is a diagrammatic elevation view of the cam and associated sensing apparatus shown in FIG. 6.

According to the invention, the printhead controlling apparatus 80 (FIG. 6) additionally includes apparatus for sensing the printing and non-printing positions of the printhead 32. To that end, the printhead moving structure 84 includes sensing apparatus (FIG. 6 and 7) including a magnet 120, which is conventionally fixedly connected to the cam lobe 122, and a pair of magnetic field proximity sensors S-1 and S-2 which are respectively conventionally connected to the CPU (FIG. 2). The sensors S-1 and S-2 (FIGS. 6 and 7) are suitably spaced apart from each other and conventionally attached to the meter's framework 19, for sensing the cam lobe magnet 120 at each of two positions 130, 132. One of the positions, i.e., position 130, corresponds to the location of the cam lobe 122 when the printhead 32 is located in its non-printing position, as shown by the dashed line portrayal of the printhead 32 in FIG. 6, and the other of the positions, i.e., position 132, corresponds to the location of the cam lobe 122 when the printhead 32 is located in its printing position, as shown by the solid line portrayal of the printhead in FIG. 6. When the cam lobe magnet 120 is located in either of the aforesaid positions, 130 or 132, the sensors S-1 and S-2, respectively, provide input data to the CPU (FIG. 2) which is indicative of the position of the magnet 120 (FIG. 6), and thus of the location of the printhead 32 in the corresponding printing and non-printing positions (FIG. 3).

The printhead controlling apparatus 80 (FIG. 6) additionally includes a sensor S-3 (FIG. 3) which is located in the letter feed path for sensing the leading edge of a given letter 70 as the letter is being fed to the second printing station 42. The sensor S-3 is preferably positioned the same distance from the printhead 32, as measured along the feed path of the letter 70, as the distance between the first and second printheads 30 and 32, as measured along the feed path of the ribbon 48. Moreover, the sensor S-3 is conventionally coupled to the CPU (FIG. 2) for providing input data to the CPU whenever the leading edge of a given letter 70 (FIG. 3) is sensed, to facilitate timely commencing and discontinuing printing at the first and second printing stations 40 and 42, and to facilitate timely movement of the second printhead 32 to and between its printing and non-printing positions.

According to the invention, the printhead 32 (FIG. 3) is normally located in the non-printing position, portrayed by the dashed-line representation of the printhead 32, to facilitate loading the cassette 34 into the printing unit 28, and to permit initially feeding stepped and other irregularly-shaped letters, including letter mail, between the printhead 32 and backing roller 74 without damaging the ribbon 48. In this connection, the cassette 34 preferably includes a roller 140 having a shaft 143, and a relatively weak tension spring 142. The roller 140 is disposed in rolling engagement with the ribbon 48 within the enclosure 44, and spring 142 has one end suitably connected to the roller shaft 143 and the other end conventionally connected to the cassette frame 38 for lightly urging the roller 140, and thus the ribbon 48, inwardly of the cassette 34. With this arrangement, as the printhead 32 is moved to and between the printing and non-printing positions, shown by the solid and dashed line portrayals of the printhead 32, sufficient tension is exerted on the ribbon 48 by the roller and spring combination, 140 and 142, to cause the ribbon 48 to be lightly held in engagement with the printhead 32. Thus the ribbon 48 is alternately disposed in the printing and non-printing positions, illustrated by the solid and dashed line portrayals of the ribbon 48 at the second printing station 42, when the printhead 32 is moved to its corresponding printing and non-printing positions.

Figure 8:
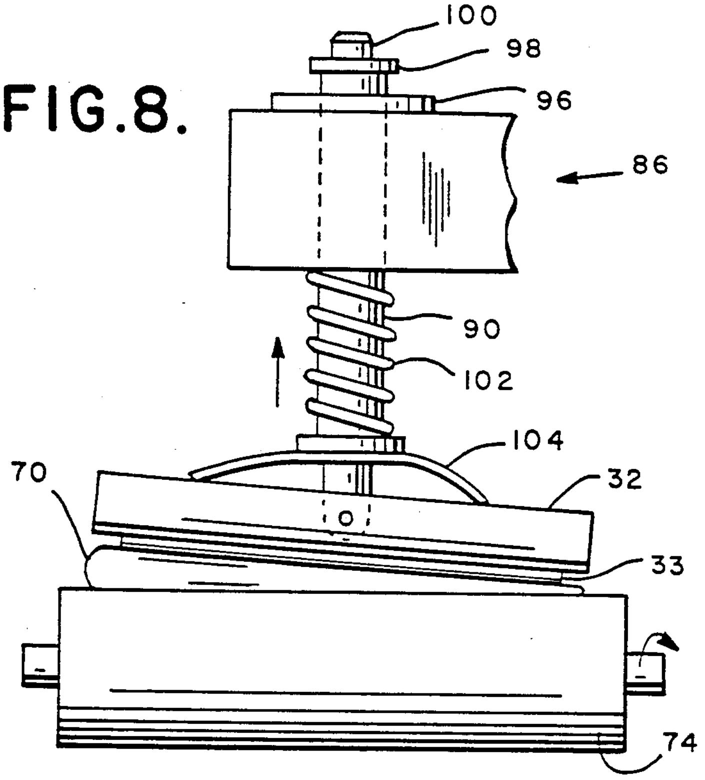
FIG. 8 is a view, similar to FIG. 6, showing the thermal printhead, spring and roller of FIG. 6, and including a letter engaged by the printhead and roller.
Figure 9:
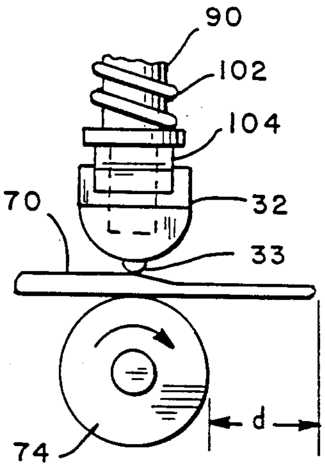
FIG. 9 is a side view of the structure of FIG. 6, but including a stepped letter replacing the letter of FIG. 6.

As shown in FIGS. 8 and 9, due to the printhead 32 being resiliently biased into engagement with a given letter 70 by means of the springs 102 and 104, as the letter 70 is fed between the printhead 32 and roller 74, the printhead 32 moves against the forces exerted by the springs, 102 and 104, to follow the contour of the printhead-engaged surface of the letter 70 and additionally flatten the printhead-engaged surface along a line extending parallel to heating bar 33 of the printhead 32, even though the letter 70 may have a wedge-shaped transverse cross-section, for example as shown in FIG. 8. Since movement of the printhead 32 relative to the letter 70 is a function of the configuration of the transverse cross-section of a given letter 70, printhead movement varies Thus the printhead controlling structure 80 (FIG. 6) automatically adjusts printhead pressures to compensate for different irregularities in transverse cross-section of differently stepped or other irregularly-shaped letters 70, including letter mail, while continuously holding the printhead pressure to as low a compression level as possible in view of variations in the transverse cross-section of the letter 70, without sacrificing the quality of image resolution.

In order to compensate for irregularities in stepped or irregularly-shaped letters 70, (FIGS. 8 and 9) including letter mail, it is a feature of the invention to provide, either alone or in combination with the above described printhead controlling structure 80, an improved backing roller 74 (FIG. 2), such as one or the other of the backing rollers 74 shown in FIGS. 10–13 and 16.

Figure 16:
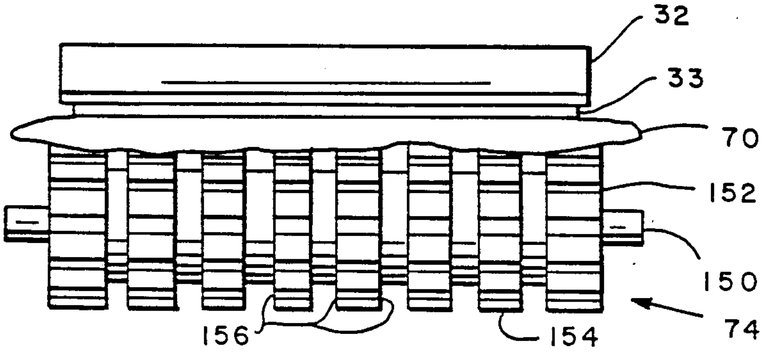
FIG. 16 is a diagrammatic view, similar to FIG. 15, showing a prior art printhead engaging a letter supported by a printhead backing roller according to the invention.

According to the invention, the backing rollers 74 (FIGS. 8–13 and 16) each include a rigid shaft 150 having conventionally mounted thereon, or otherwise integrally attached thereto, a roller body portion 152, having a cylindrically-shaped outer surface 154, which is made of a flexible material, such as rubber or synthetic rubber, or the like. In addition, each of the roller body portions 152 includes at least one and preferably a plurality of channels 156 formed therein, from the outer surface 154 of the roller body portion 152, for augmenting the flexibility of the respective roller body portions 152 when disposed in engagement with a letter 70, for example, as shown in Fig. 16.

Figure 10:
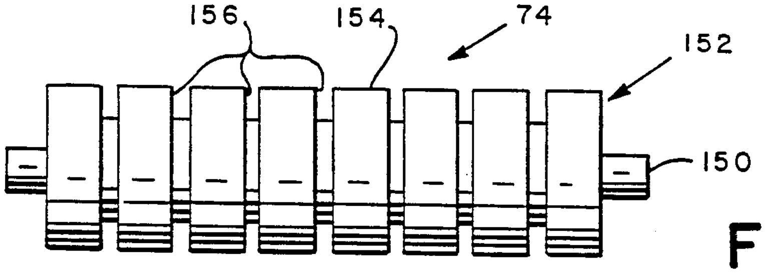
FIG. 10 is a side view of a printhead backing roller according to the invention.

As shown in FIG. 10, the roller body portion 152 includes a plurality of channels 156, each of which extends into the roller body portion 152 from the outer surface 154 and extends coaxially with the shaft 150. Moreover, the channels 156 are preferably spaced apart from one another and located at equal intervals along the length of the roller body portion 152.

Figure 11:
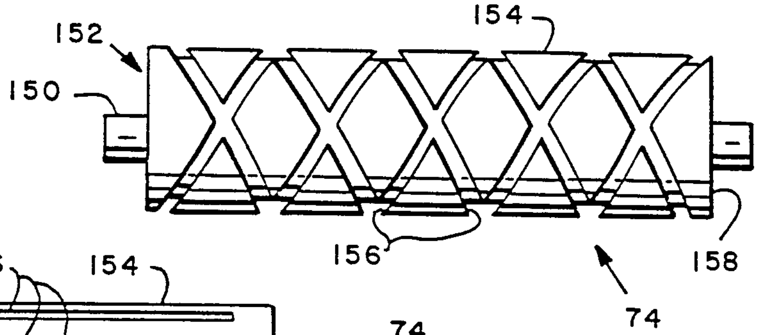
FIG. 11 is a side view of another printhead backing roller according to the invention.

As shown in FIG. 11, the roller body portion 152 may include two channels 156 each of which extends into the roller body portion 152 from the outer surface 154 and defines a spiral channel 156 extending longitudinally of the length of the roller body portion 152. As viewed from a given end 158 of the roller 74 one of spiral channels 156 is a clockwise-extending channel 156 and the other is a counter-clockwise extending channel 156.

Figure 12:
FIG. 12 is a side view of another printhead backing roller according to the invention.

Moreover, as shown in FIG. 12, the roller body portion 152 may include a plurality of channels 156, each of which extends longitudinally of the length of the roller body portion 152 and substantially parallel to the axis of the shaft 150. In this embodiment, the respective channels 156 are spaced apart from one another and located at equal intervals along the circumference of the roller body portion 152.

Figure 13:
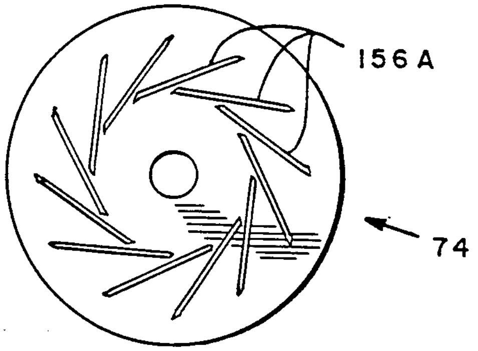
FIG. 13 is an end view of yet another printhead backing roller according to the invention.

Further, as shown in FIG. 13 the roller body portion 152 may include a plurality of longitudinally-extending apertures 156A, which are formed in the roller body portion 152 between the outer surface 154 and shaft 150. Each of the apertures 156A is arcuately-shaped in transverse cross-section and extends longitudinally of the entire length of the roller body portion 152, thereby providing a multiply-cored roller body portion 152. Moreover, a given radius drawn from the axis of the roller shaft 150 to the roller's outer surface 154, preferably intersects a plurality of the apertures 156, and such apertures 156 are preferably located relative to one another, and at an angle with respect to the shaft 150 and outer surface 154, such that the flexibility of the roller body portion 152 is uniform throughout its longitudinal length when subjected to externally applied pressure.

According to the invention, the roller body portion 152 (FIG. 8) of the backing roller 74, preferably includes a plurality of the channels 156 or apertures 156A shown in one or more of FIGS. 10–13 inclusive, whereby the flexibility of the roller body portion 152 is greatly augmented. Thus, assuming the combination of the channels 156 shown in FIGS. 10 and 12, the roller body portion 152, as viewed from the outer surface 154 thereof would have the appearance of a cylindrically-shaped checkerboard having square-shaped islands defined by the channels 156, for example as shown in FIG. 16. On the other hand, assuming the provision of the roller body portion 152 of FIG. 11, the appearance of the outer surface 154 of the roller body portion 152 is that of a checkerboard having diamond-shaped islands defined by the channels 156.

Figure 14:
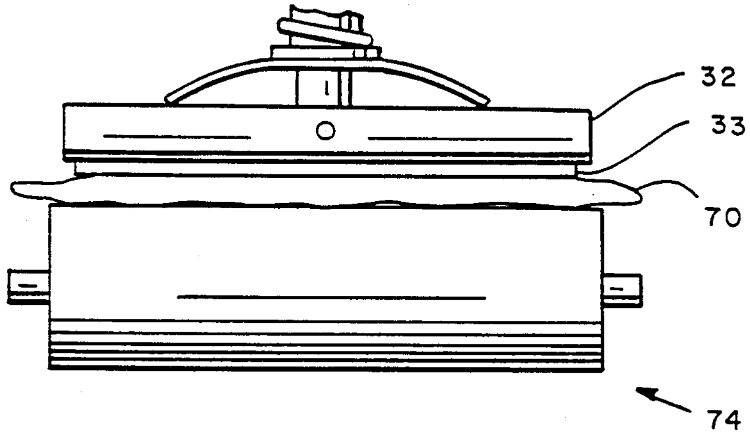
FIG. 14 is a diagrammatic view of a printhead according to the invention engaging a letter supported by a prior art printhead backing roller.
Figure 15:
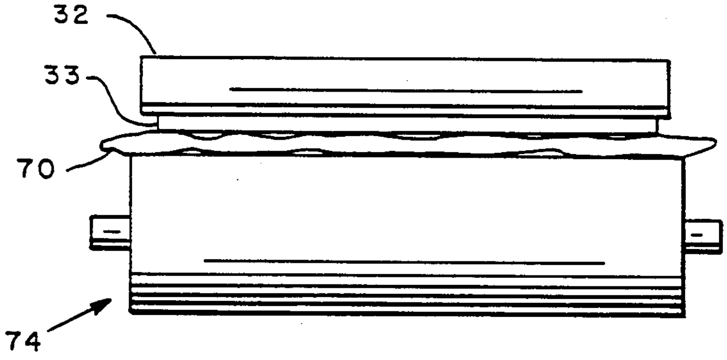
FIG. 15 is a diagrammatic view, similar to FIG. 14, showing a prior art printhead engaging a letter supported by a prior art printhead backing roller.

As shown in FIG. 14, assuming the provision of the printhead controlling structure 80 according to the invention, the printhead 32 tends to follow the contour of the printhead-engaged surface of the letter 70 and flatten the same. On the other hand, since the roller 74 of FIG. 14 is a conventional prior art backing roller 74, having a hardened outer surface, the roller fails to conform to the roller engaged surface of letter 70. As shown in FIG. 15, utilizing both conventional prior art printing structure and a conventional prior art backing roller 74, neither the printhead 32 nor backing roller 74 engages the letter 70. On the other hand, as shown in FIG. 16, whether or not the printing structure is prior art structure, when the flexible backing roller 74 according to the invention is utilized, the printhead 32 tends to urge the letter into surface-to-surface engagement with the roller body portion 152 and compress the same, whereby the printhead-engaged surface of the letter 70 becomes flattened.

Figure 17:
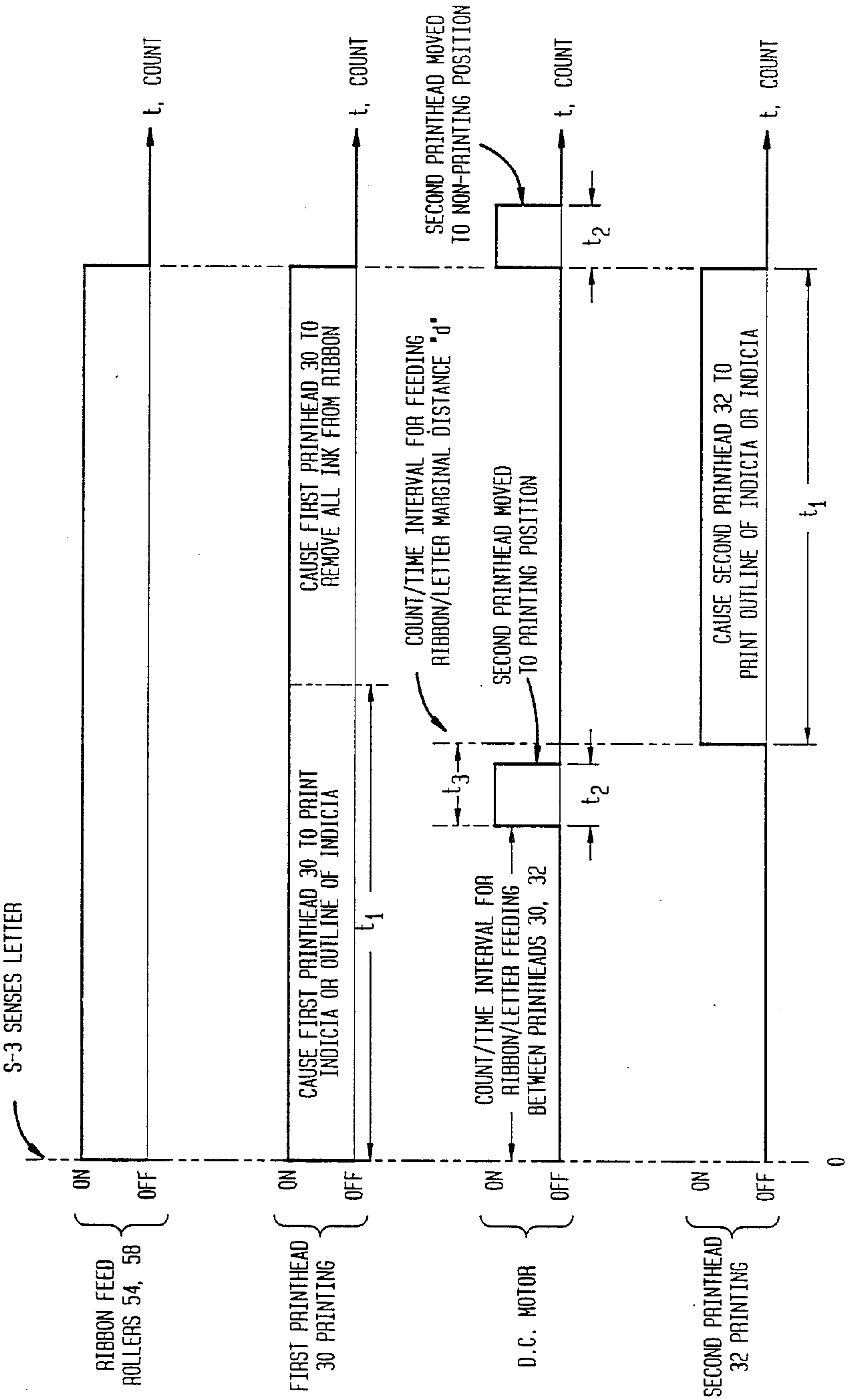
FIG. 17 is a timing diagram showing thermal transfer ribbon and printhead movement, and printhead operation, in the course of a printing cycle.

In general, when the leading edge of a given letter 70 (FIG. 3) is detected by the sensor S-3, the CPU implements a routine for causing a printing cycle count to be commenced, causing the printhead backing roller 58 and take-up spool 54 to commence rotating and moving the ribbon 48 (FIG. 17) in synchronism with the movement of the letter 70 (FIG. 3) to the second printing station 42, and causing the first printhead 30 (FIG. 17) to commence printing. The first printhead 30 transfers the outline of indicia pattern, or indicia pattern, as the case may be, from the length of ribbon 48 being fed to the second printing station 42 (FIG. 3), to the length of ribbon 48 being fed about the printhead backing roller 58. Then the first printhead 30 commences removing all of the ink (FIG. 17) from the length of ribbon 48 being fed to the second printing station 42 (FIG. 3), thereby "blanking" the ribbon 48. While printing is in progress at the first printing station 40, the ribbon 48 advances to the second printing station 42, as does the letter 70. Moreover, the leading edge of the letter 70 enters the second printing station 42 before indicia printing is completed at the first printing station 40 (FIGS. 3 and 17). Accordingly, prior to completion of printing at the first printing station 40, the microcomputer IC timely causes the second printhead 32 to be moved from its non-printing to printing position and to commence transfer printing of the indicia pattern remaining on the ribbon 48 to the letter 70. Preferably such printing commences a predetermined marginal distance "d" (FIGS. 9 and 17) from the leading edge of the letter 70. Whereupon the indicia or outline of indicia pattern remaining on the ribbon 48 at the second printing station 42 is transferred in its entirety to the letter 70 as the letter 70 is fed through the second printing station 42. Upon completion of indicia printing at the second printing station 42, the CPU, in response to the printing cycle count, causes both printheads 30 and 32 to cease printing, followed by the CPU causing the second printhead 32 to be moved from its printing to non-printing position. Whereupon, the microcomputer terminates the printing cycle count.

Figure 18A:
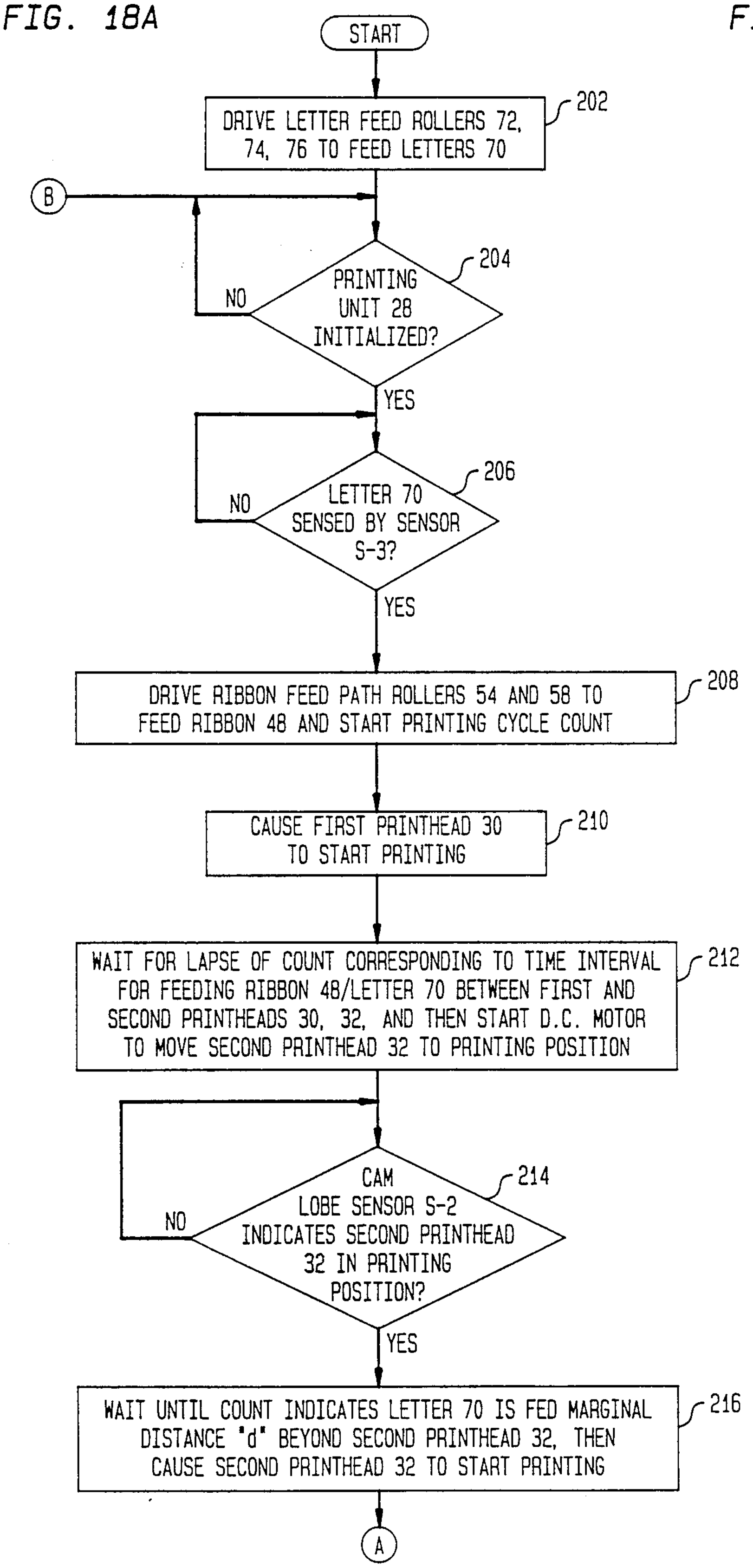
FIG. 18 is a flow chart showing the process implemented by the microcomputer controlling movement of the thermal transfer ribbon and printheads, and printhead operation, according to the invention.
Figure 18:
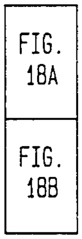
Figure 18B:
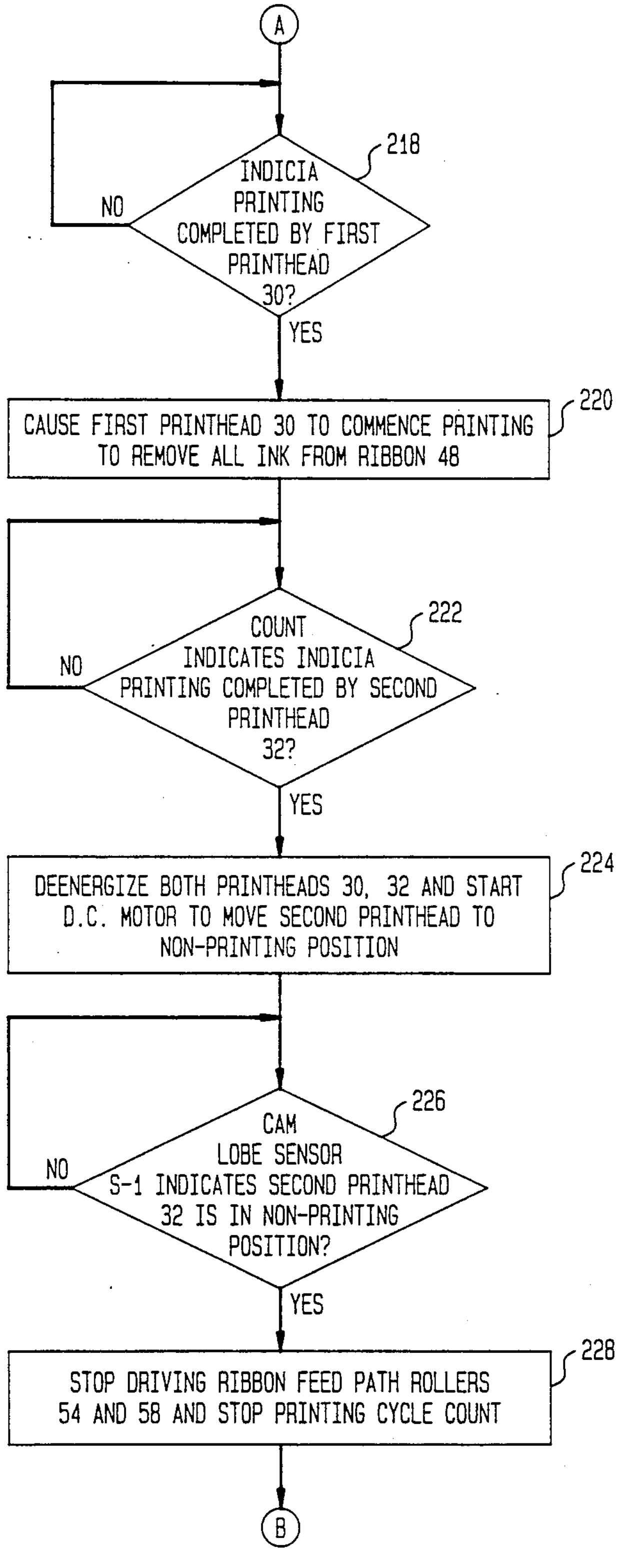

More particularly, assuming the machine 10 (FIG. 1) is conventionally energized and a cartridge 34 (FIG. 3) is inserted into the printing unit 28 (FIG. 1), according to the invention the microcomputer IC (FIG. 2) implements the program 200 shown in FIG. 18. As shown in FIG. 18, the microcomputer IC initially implements the step 202 of energizing the letter feeding rollers 72, 74 and 76 and then makes a determination, step 204 as to whether or not the printing unit 28 has been initialized, as hereinbefore discussed. Assuming the printing unit 28 has not been initialized, then the microcomputer IC causes the program 200 to loop through step 204 until printing unit initialization has been completed. Assuming completion of printing unit initialization, step 204, the microcomputer IC then implements the step, 206, of determining whether or not a letter 70 is in the letter feed path. Accordingly, step 206 includes making a determination as to whether or not the sensing structure S-3 has detected a letter 70 in the letter feed path. Assuming a letter 70 is not sensed, the microcomputer causes the program 200 to continue to loop through step 206 until a letter 70 is sensed. Whereupon, the microcomputer implements the step 208 of energizing the driving units DU (FIG. 2) for driving the ribbon take-up spool 54 and printhead backing roller 58 (FIG. 3) and starting a printing cycle count, followed by the step, 210 (FIG. 18), of causing the first printhead 30 to commence printing. The microcomputer then implements the step, 212, including the functions of waiting for the lapse of a count corresponding to the time interval needed to feed the letter 70 and ribbon 48 from the first printhead 30 to the second printhead 32, and then causing energization of the d.c. motor 112 for causing the cam 116 to move the second printhead 32 from its non-printing to printing position. Whereupon, the microcomputer IC implements the step 214 of determining whether or not the cam lobe sensor S-2 has sensed that the printhead 32 has been moved to the printing position. Until the printhead 32 is so moved, the microcomputer causes the program to loop through step 214 until the cam lobe sensor S-2 provides input data to the CPU indicating that the printhead 32 is in its printing position. When the printhead 32 is in its printing position, and in addition the printing cycle count is such that it is indicative that the leading edge of the letter 70 has moved a distance "d" (FIG. 9) beyond the second printing station 42 (FIG. 3), then the microcomputer implements the step 216 (FIG. 18) of energizing the printhead 32 for causing the transfer to the letter 70 of the remainder of the ink on the ribbon 48. Whereupon, the microcomputer implements the step 218 of making a determination as to whether or not the outline-of-indicia, or indicia, as the case may be, which is being transferred at the first printing station is completed. Assuming that it has not, the microcomputer causes the program 200 to loop through step 218 until indicia printing is completed. Assuming, however, that indicia printing is completed at the first printing station 40, the microcomputer then implements the step, 220, of causing the first printhead 30 to commence removing all ink from the ribbon 48, thereby providing a "blanked" ribbon 48. Thereafter the microcomputer implements the step, 222, of determining whether or not the count lapse since commencement of energizing the second printhead 32 corresponds to the count lapse for printing the indicia pattern at the first printing station 40. Assuming that it has not, the microcomputer causes the program 200 to loop through step 222 until such time as the respective counts correspond to one another, whereupon the microcomputer implements the step 224 of deenergizing the respective printheads 30, 32 and causing the d.c. motor 112 to be energized for moving the second printhead 32 from its printing position to non-printing position, followed by the step 226 of causing implementation of a determination as to whether or not the cam lobe sensor S-1 has provided input data to the CPU indicating that the second printhead 32 has been moved from its printing to non-printing position. Assuming that the printhead 32 has not moved to its non-printing position, the microcomputer causes the program 200 to loop through step 226 until the printhead 32 is in its non-printing position. Whereupon the microcomputer causes the program 200 to implement the step 228 of deenergizing the ribbon driving units DU for causing the printhead roller 58 and take-up spool 54 to stop rotating, and thus to stop feeding the ribbon 48, and causing the printing cycle count to be terminated. Whereupon processing is returned to step 204.

In accordance with the objects of the invention, there has been disclosed thermal printing apparatus including methods and apparatus for processing letters, and more particularly for marking stepped or other irregularly-shaped letters, including letter mail.

The specific embodiments of the letter processing apparatus have been described for the purposes of illustrating the manner in which the invention may be made and used. Since the implementation of other variations and modifications of the invention will be apparent to those skilled in the art, the invention is not limited by the specific embodiments described. Accordingly, the following claims should be interpreted to cover the subject matter set forth therein and any equivalents of the invention that falls within the true spirit and scope of the invention.

What is claimed is:

1. In printing apparatus of the type which includes a ribbon having a backing layer and an ink donor layer supported on the backing layer, wherein the apparatus includes a first thermal printhead for transfer printing a first ink pattern from the ink donor layer to the backing layer at a first printing station, a second thermal printhead for transfer printing a second ink pattern from the ink donor layer to a workpiece at a second printing station, a process comprising the steps of:

a. sensing a letter being fed to the second printing station;
b. starting feeding the ribbon;
c. starting printing at the first printing station;
d. moving the second printhead from a non-printing position to a printing position;
e. starting printing at the second printing station;

f. stopping printing at the first and second printing stations;

g. stopping feeding the ribbon; and h. moving the second printhead from the printing position to the non-printing position.

2. The process according to claim 1, wherein step (b) includes the step of starting a printing cycle count, and wherein step (h) includes the step of stopping the printing cycle count.

3. The process according to claim 1, wherein step (d) follows step (c).

4. The process according to claim 1, wherein step (d) follows step (c) after a time delay during which the ribbon is fed between the first and second printheads.

5. The process according to claim 1, wherein step (d), follows step (c) when the ribbon is at the second printing station.

6. The process according to claim 1, wherein step (d) follows step (c) upon lapse of a predetermined time interval.

7. The process according to claim 2, wherein step (d) follows step (c) upon lapse of a predetermined printing cycle count.

8. The process according to claim 2, wherein step (d) follows step (c).

9. The process according to claim 1, wherein step (c) includes the step of printing an ink pattern in the form of an outline of an indicia.

10. The process according to claim 1, wherein step (c) includes the step of printing an ink pattern in the form of an indicia.

11. The process according to claim 1, wherein step (e) includes the step of printing an ink pattern in the form of an outline of an indicia.

12. The process according to claim 1, wherein step (e) includes the step of printing an ink pattern in the form of an indicia.

13. The process according to claim 9, wherein step (e) includes the step of transfer printing to the workpiece all ink remaining on the backing layer of the ribbon whereby the ink pattern printed on the workpiece is in the form of the indicia.

14. The process according to claim 10, wherein step (e) includes the step of transfer printing to the workpiece all ink remaining on the backing layer of the ribbon, whereby the ink pattern printed on the workpiece is in the form of an outline of the indicia.

15. The process according to claim 1, including the step of sensing when the second printhead is at the printing position and then implementing step (e).

16. The process according to claim 9, wherein step (c) includes the steps of transfer printing said ink pattern to the backing layer and transfer printing all remaining ink from the ink donor layer to the workpiece after printing the ink pattern.

17. The process according to claim 10, wherein step (c) includes the step of transfer printing said ink pattern to the backing layer and transfer printing all remaining ink from the ink donor layer to the workpiece after printing the ink pattern.

18. The process according to claim 1, wherein step (e) follows step (d) when the leading edge of the letter is fed a predetermined marginal distance past the second printhead.

19. The process according to claim 1 wherein the step of moving the second printhead from the printing position to the non-printing position includes moving the second printhead a distance sufficient to accommodate stepped and other irregularly-shaped letter mail between the second printhead and a backing element which cooperates with the second printhead in the second printing station.

20. The process according to claim 1 including maintaining the tension in the ribbon in the printing and non-printing positions of the second printhead.

21. In printing apparatus of the type which includes a ribbon having a backing layer and an ink donor layer supported on the backing layer, wherein the apparatus includes a first thermal printhead for transfer printing a first ink pattern from the ink donor layer to the backing layer at a first printing station, a second thermal printhead for transfer printing a second ink pattern from the ink donor layer to a workpiece at a second printing station, a process comprising the steps of:

a. sensing a letter being fed to the second printing station;

b. starting feeding the ribbon;

c. starting printing at the first printing station;

d. moving the second printhead from a non-printing position to a printing position;

e. starting printing at a second printing station;

f. stopping printing at the first and second printing stations;

g. stopping feeding the ribbon;

h. moving the second printhead from the printing position to the on-printing position over a distance sufficient to accommodate stepped and other irregularly-shaped letter mail between the second printhead and a backing element which cooperates with the second printhead in the second printing station;

i. maintaining the tension in the ribbon in the printing and non-printing positions of the second printhead.

* * * * *